United States Patent [19]

Cleer, Jr.

[11] Patent Number: 4,694,783
[45] Date of Patent: Sep. 22, 1987

[54] MULTIPLE BOILER HEATING SYSTEM WITH IMPROVED VENTING AND HEAT RECLAMATION

[76] Inventor: Clarence W. Cleer, Jr., 98 Fraley St., Kane, Pa. 16735-9524

[21] Appl. No.: 1,747

[22] Filed: Jan. 9, 1987

[51] Int. Cl.$^4$ .................... F22B 37/42; F22D 5/00
[52] U.S. Cl. ........................ 122/448 B; 122/1 A; 122/106 R
[58] Field of Search ............... 122/448 B, 1 A, 1 R, 122/406 R; 237/67; 236/14

[56] References Cited

U.S. PATENT DOCUMENTS

| | | | |
|---|---|---|---|
| 1,544,310 | 6/1925 | Gibson | 122/448 B |
| 1,860,364 | 5/1932 | Lamont | 22/448 B |
| 4,564,142 | 1/1986 | Cleer | 237/8 R |
| 4,583,497 | 4/1986 | Likins, Jr. et al. | 122/448 B |

OTHER PUBLICATIONS

Hydro Therm brochure "Pulse Combustion Heating Plants".

Primary Examiner—Edward C. Favors
Attorney, Agent, or Firm—Nixon & Vanderhye

[57] ABSTRACT

Disclosed is a heating system of the multiple condensing boiler type wherein hot exhaust gases are in heat exchange relation with the condensate in a manifold common to the boilers. The exhaust gas conduits from the boilers open into the manifold at a level below the condensate level to prevent backflow of exhaust gases from active to idle boilers and enable the exhaust gases to bubble through the condensate in improved heat exchange relation therewith. A single outlet vents the exhaust gases from the manifold. The hot condensate is circulated in heat exchange relation with incoming atmospheric air in a second manifold common to the boilers for preheating the air flowing to the boilers. The cooled condensate is recirculated back to the first manifold. A single intake provides the incoming air to the second manifold.

12 Claims, 2 Drawing Figures

MULTIPLE BOILER HEATING SYSTEM WITH IMPROVED VENTING AND HEAT RECLAMATION

BACKGROUND OF THE INVENTION

This invention relates to heating systems and particularly relates to heating systems of the multiple condensing boiler type having improved venting and reclamation of waste exhaust heat.

Heating systems often employ multiple boiler units for providing boiler fluid, usually water, to a supply line connected to a central heating unit or to a domestic water heater or a combination of both. For example, in modern gas-fired hydronic boilers of the condensing type, sealed combustion chambers are provided with air and fuel gas. Upon firing, the combustion gas products pass downwardly over a heat exchanger containing boiler water. The heated water flows, normally in parallel, from each boiler to a common central supply line for routing to one or more heating units contiguous to the spaces to be heated or to a domestic water heating plant or both. A return line supplies water to the inlet side of each of the boilers. In such systems, the hot gases passing through the heat exchanger are cooled in water vapor condenses from the gases, releasing its latent heat of vaporization, which increases the efficiency of the heat exchanger.

In practice, any number of boiler units may comprise the heating system and each unit conventionally has its own air inlet and exhaust outlet. To provide such multiple inlets and outlets, substantial installation and construction costs are incurred. Additionally, while conventional hydronic boilers of the condensing type have increased efficiency due to utilization of the latent heat of vaporization, gas outlet exhaust temperatures still lie in a range of 110° to 130° F., resulting in substantial loss of heat to the system. Further, while this somewhat reduced exhaust gas temperature permits venting the exhaust gases through plastic pipe rather than through conventional chimney construction, still it has been the practice to provide individual inlets from and outlets to the atmosphere for the boilers, thus maintaining relatively high installation and construction costs.

SUMMARY OF THE PRESENT INVENTION

According to the present invention, there is provided a heating system which affords reclamation of a considerable portion of the heat which would have otherwise been lost as part of the exhaust gases. To accomplish this, and in a preferred embodiment of the present invention, there is provided a heating system having a plurality of boilers, wherein each boiler is of the aforementioned condensing type having a combustion chamber with an air inlet, a heat exchanger having a boiler water inlet and outlet and disposed in heat exchange relation with the hot combustion gases from the combustion chamber, and an exhaust gas outlet. Means are provided for reclaiming heat from the exhaust gases and include a first manifold together with means for directing the hot exhaust gases and condensate from each of the boilers into the first manifold, wherein the exhaust gases and condensate are placed in heat exchange relation. A second manifold is provided for admitting atmospheric air into the heating system and has means for communicating air to the air inlet for each boiler. A heat exchanger is also provided in the second manifold. Means for flowing heated condensate from the first manifold to the heat exchanger in the second manifold and placing the inlet air in heat exchange relation with the hot condensate are provided whereby the inlet air is preheated prior to flowing into the combustion chambers of the boilers. The condensate from the heat exchanger is also recirculated from the second manifold back to the first manifold. Thus, by heating the condensate using the exhaust gases from the boilers and circulating hot condensate in heat exchange relation with the incoming air, substantial heat, otherwise lost, is reclaimed and incoming air to the boilers is preheated, providing improved heating efficiency.

In a preferred embodiment of the present invention, conduits for exhausting combustion gases from the boilers are disposed in the first manifold such that their outlets lie below the level of the condensate in the first manifold. In this manner, improved heat transfer between the exhaust gases and the condensate is provided and migration or backflow of exhaust gases into idle boilers is prevented. The condensate level in the first manifold may be controlled by a valve located in the condensate exhaust line.

Also, in accordance with this invention, the first manifold is provided with only a single exhaust gas outlet or vent and the second manifold is provided with only a single intake for atmospheric air. By locating the manifolds adjacent the boilers and running a single air intake line and a single exhaust line to the atmosphere from the respective manifolds, construction and installation costs for the heating system in accordance with this invention are minimized.

Accordingly, it is a primary object of the present invention to provide, in a heating system using multiple boilers of the hydronic condensate type, improved apparatus and methods for optimizing reclamation of waste heat and reducing construction and installation costs.

These and further objects and advantages of the present invention will become more apparent upon reference to the following specification, appended claims and drawings wherein:

BRIEF DESCRIPTION OF THE DRAWING FIGURES

FIG. 1 is a schematic illustration of a heating system constructed in accordance with the present invention; and FIG. 2 is a cross-sectional view of the manifold which receives the exhaust gases and condensate from the boilers illustrating the location of the exhaust gas tubes in relation to the level of condensate in the manifold.

DETAILED DESCRIPTION OF THE DRAWINGS

Figures 1, 2:
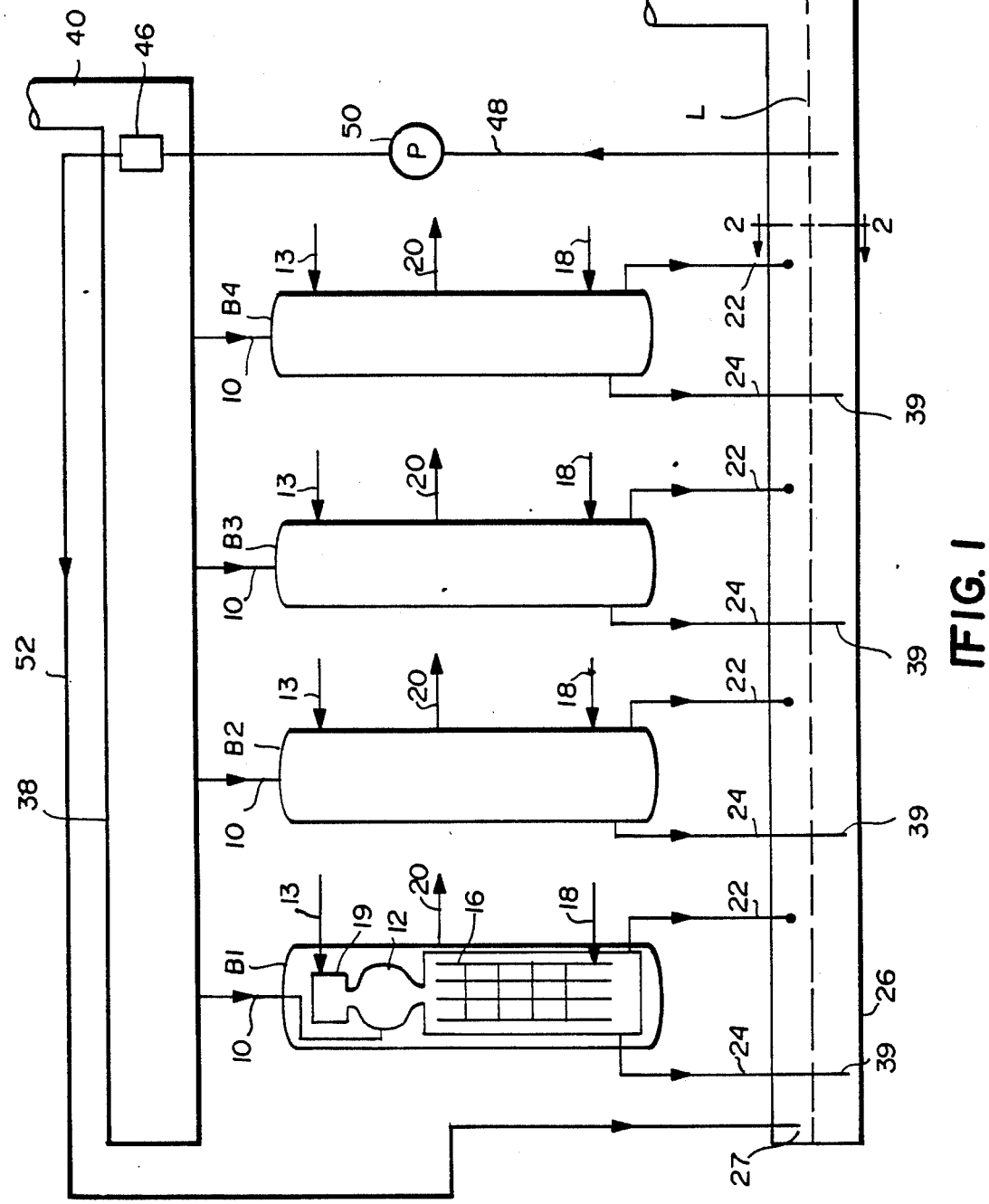

Reference will now be made in detail to the present preferred embodiment of the invention, an example of which is illustrated in the accompanying drawings.

Referring now to FIG. 1, there is schematically illustrated a heating system comprised of a plurality of boilers, illustrated at B1–B4, each of which is of the conventional hydronic condensing type. It will be appreciated that, while four such boilers are illustrated, additional or fewer boilers may be provided as needed for a particular heating system installation and that each boiler is preferably of similar construction.

In this type of boiler, inlet air is provided through an inlet conduit 10 into a combustion chamber 12. Fuel gas is supplied by conduit 13 to chamber 14 and combustion of the fuel gas/air mixture occurs in chamber 12, at which time the hot combustion gases are driven downwardly about a heat exchanger 16. Heat exchanger 16 has a boiler water return inlet 18 and boiler water supply outlet 20. It will be appreciated that the combustion gases flowing downwardly through heat exchanger 16 heat the boiler water contained therein and the heated water flows from supply outlet 20 to a supply line, not shown, common to the outlets 20 to one or more heating units or a hot water heating system, or both, as desired. The water from such heating unit or domestic hot water heating system is returned to the boilers via a return line, not shown, common to inlets 18.

In this type of boiler, the hot combustion gases, when disposed in heat exchange relation with the boiler water in heat exchanger 16, are cooled to a temperature where condensation occurs. The condensate is removed from the boiler by a conduit 22. Exhaust gases are likewise removed from the boiler by a circuit 24.

In accordance with the present invention, there is provided a first manifold in communication with the boilers for receiving the condensate as well as the hot exhaust gases. Particularly, the manifold 26 may comprise an elongated cylindrical tank defining a chamber 27 into which the condensate from the boilers is supplied through condensate exhaust conduits 22 connected with each boiler. As will be appreciated from the ensuing description, a predetermined level L of condensate is maintained in chamber 27 of manifold 26. To accomplish that, a condensate drain line 28 in communication with chamber 27 is provided with a control valve 30. By opening or closing valve 30, control of the level of condensate in the manifold is afforded. An exhaust vent 32 is also provided manifold 26 for venting the cool gaseous exhaust products. The gaseous exhaust products from all of the boilers are thus cooled sufficiently in manifold 26 to permit their venting through a single plastic vent to the atmosphere whereby the installation of and costs associated with multiple vents are avoided.

The exhaust gas conduit 24 from each boiler extends into manifold 26 such that its outlets 34 is located a predetermined distance below the level of condensate maintained in chamber 27 of manifold 26. This prevents migration of backflow of exhaust gases through the exhaust conduit 24 of an idle boiler. Additionally, and importantly, the hot exhaust gases bubble through the condensate in manifold 26 in heat exchange relation therewith, thereby heating the condensate and cooling the exhaust gases as the latter bubble free of the condensate. In this process, substantial heat is given up by the exhaust gases to the condensate whereby relatively cool exhaust gases exit the manifold through outlet 32.

There is also provided a second manifold 38 which has a single air intake 40 communicating with atmospheric air external to the heating system. Each air inlet conduit 10 communicates between manifold 38 and its respective boiler whereby manifold 38 provides a source of atmospheric air common to the boilers. Disposed in manifold 38 and in the incoming air stream upstream of air inlet conduits 10 is a heat exchanger 46. Heat exchanger 46 may be conventional and comprise a series of pipes with fins providing for good heat exchange. Hot condensate from manifold 26, heated in chamber 27 by the hot exhaust gases from the boiler, is provided heat exchanger 46 through conduit 48 by means of a pump 50. It will be appreciated that the condensate inlet for conduit 48 is located in manifold 26 downstream of the outlets 34 of exhaust gas conduits 24 whereby optimum heat exchange between the hot exhaust gases and the cooler condensate may occur prior to flowing the heated or hot condensate to heat exchanger 46. Heat from the hot condensate is given up to the cooler atmospheric air entering the heating system through air inlet 40 in heat exchanger 46. Consequently, incoming atmospheric air is preheated by reclaiming heat from the condensate in heat exchanger 46, enabling preheated air to flow to the combustion chambers of the boilers via conduits 24. A return conduit 52 is provided for circulating the cooled condensate from heat exchanger 46 back to the first manifold 26.

Thus, it will be seen that in accordance with the present invention, heat, otherwise lost in conventional multiple boiler systems of this type, is reclaimed for preheating the incoming air to the boilers. Improved heating efficiency as well as cooler exhaust air from the heating system are also afforded. Additionally, the single vent for the first manifold and the single inlet for the second manifold, in accordance with the present invention, eliminate the multiplicity of inlets and vents otherwise necessary in conventional constructions in heating systems using multiple boilers of this type and thereby substantially reduce attendant construction and installation costs. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

It is claimed:

1. A heating system comprising:

a plurality of boilers of the condensing type each having a combustion chamber, an air inlet for providing air into said combustion chamber, a heat exchanger having a fluid inlet and a fluid outlet and disposed in heat exchange relation with hot combustion gases flowing from said combustion chamber, and an exhaust gas outlet;

means for reclaiming heat from the exhaust gases comprising a first manifold common to said boilers, means for directing the hot exhaust gases and condensate from each boiler into said first manifold wherein the exhaust gases and condensate are placed in heat exchange relation, a second manifold for receiving air external to said heating system, said air inlet for each said boiler lying in communication with said second manifold for flowing air into the corresponding combustion chamber, a heat exchanger in said second manifold, means for flowing heated condensate from said first manifold to said heat exchanger in said second manifold for placing the condensate in heat exchange relation with the inlet air, thereby preheating the air flowing into the combustion chambers of the boilers; and means for recirculating the condensate from said heat exchanger in said second manifold to said first manifold.

2. A heating system according to claim 1 including means for venting the exhaust gases from said first manifold after they pass in heat exchange relation with the condensate.

3. A heating system according to claim 1 wherein said first manifold has a single outlet only for venting the exhaust gases from said first manifold after they pass in heat exchange relation with the condensate, said second manifold having a single inlet only for receiving air external to the heating system.

4. A heating system according to claim 1 wherein, for each said boiler, said hot exhaust gas directing means includes a conduit in communication with said boiler and received within said first manifold, each conduit having an outlet opening located below the surface of the condensate in said first manifold whereby reverse flow of exhaust gases from one boiler to another through said exhaust conduits is precluded.

5. A heating system comprising:
a plurality of boilers, each said boiler being of the condensing type having a combustion chamber, an air inlet for providing air into said combustion chamber, a heat exchanger having a fluid inlet and a fluid outlet and disposed in heat exchange relation with hot combustion gases flowing from said combustion chamber, and an exhaust gas outlet; and
means including a first manifold for receiving both the condensate from the combustion gases and the exhaust gases from said outlets and placing the hot exhaust gases and condensate in heat exchange relation one with the other whereby the exhaust gases are cooled and the condensate heated, said first manifold having a single outlet only for venting the cooled exhaust gases to the atmosphere, means including a second manifold in communication with the air inlet for each of said boilers for placing the heated condensate in heat exchange relation with the inlet air whereby the inlet air is preheated prior to flowing into the boilers, said second manifold having a single inlet only for receiving incoming air.

6. A heating system according to claim 5 including a heat exchanger in said second manifold, means for flowing condensate from said first manifold into the latter heat exchanger, and means for circulating the condensate in said heat exchanger back to said first manifold.

7. In a heating system having a plurality of boilers of the condensating type each having a combustion chamber, an air inlet for providing air into the combustion chamber, a heat exchanger having a fluid inlet and a fluid outlet disposed in heat exchange relation with hot combustion gases flowing from the combustion chamber, and an exhaust gas outlet, a method of reclaiming heat from the exhaust gases comprising the steps of:
disposing the exhaust gases and condensate from each boiler in heat exchange relation one with the other whereby the exhaust gases are cooled and the condensate is heated;
disposing the inlet air and hot condensate in heat exchange relation one with the other to heat the inlet air and cool the condensate whereby the inlet air is preheated prior to flowing into the combustion chambers; and
recirculating the cooled condensate into heat exchange relation with the hot exhaust gases.

8. The method according to claim 7 including the further steps of flowing the cooled exhaust gases from all of the boilers through a single outlet for venting the exhaust gases to the atmosphere.

9. The method according to claim 7 including the further steps of providing a single air intake in communication with the atmosphere and flowing the atmospheric air through the air intake in relation to each of the boiler air inlets.

10. The method according to claim 9 including the further steps of flowing the cooled exhaust gases from all of the boilers through a single outlet for venting the exhaust gases to the atmosphere.

11. The method according to claim 7 wherein the step of disposing the exhaust gases in heat exchange relation with the condensate includes bubbling the exhaust gases through the condensate by introducing them below the level of the condensate.

12. The method according to claim 7 wherein the step of disposing the exhaust gases in heat exchange relation with the condensate includes providing a common chamber for receiving condensate from each of the boilers, providing an outlet conduit for the exhaust gases from each boiler in communication with the chamber and disposing the outlet of each conduit below the level of condensate in the chamber, thereby preventing backflow of exhaust gas from one boiler to another and facilitating heat exchange between the exhaust gases and the condensate.

* * * * *